United States Patent
Liu et al.

(10) Patent No.: US 11,285,516 B2
(45) Date of Patent: Mar. 29, 2022

(54) PARCEL DROPPING METHOD, SORTING ROBOT AND SORTING SYSTEM

(71) Applicant: BEIJING GEEKPLUS TECHNOLOGY CO., LTD., Beijing (CN)

(72) Inventors: Kai Liu, Beijing (CN); Hao Han, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 231 days.

(21) Appl. No.: 16/606,416

(22) PCT Filed: Dec. 12, 2017

(86) PCT No.: PCT/CN2017/115751
§ 371 (c)(1),
(2) Date: Oct. 18, 2019

(87) PCT Pub. No.: WO2019/061845
PCT Pub. Date: Apr. 4, 2019

(65) Prior Publication Data
US 2021/0114062 A1    Apr. 22, 2021

(30) Foreign Application Priority Data
Sep. 30, 2017  (CN) .......................... 201710919964.X (51) Int. Cl.
*B07C 5/36* (2006.01)
*B07C 3/00* (2006.01)
(Continued)

(52) U.S. Cl.
CPC ................. *B07C 5/36* (2013.01); *B07C 3/00* (2013.01); *B07C 3/003* (2013.01); *B07C 3/008* (2013.01);
(Continued)

(58) Field of Classification Search
CPC ................................... B07C 5/36; B07C 3/00
See application file for complete search history.

(56) References Cited

U.S. PATENT DOCUMENTS

| | | | |
|---|---|---|---|
| 6,762,382 B1 * | 7/2004 | Danelski | B07C 5/36 198/370.04 |
| 9,536,216 B1 * | 1/2017 | Lisso | B29C 65/50 |

(Continued)

FOREIGN PATENT DOCUMENTS

| | | |
|---|---|---|
| CN | 106022687 A | 10/2016 |
| CN | 107088525 A | 8/2017 |

(Continued)

OTHER PUBLICATIONS

Office action dated Aug. 18, 2021 from corresponding Korean Application No. 10-2020-7008797.

(Continued)

*Primary Examiner* — Thomas Randazzo (74) *Attorney, Agent, or Firm* — Arent Fox LLP (57) ABSTRACT

Provided are a parcel dropping method for a parcel picking system, a picking robot, and a picking system. The method includes providing a conveying device; operating the conveying device to receive a parcel and move towards a delivery target; and operating the conveying device to deliver the parcel to the delivery target after the conveying device moves to a delivery region. The motion speed of the conveying device is not equal to zero when the conveying device delivers the parcel.

20 Claims, 5 Drawing Sheets

(51) Int. Cl.
　　*G01C 21/34*　　(2006.01)
　　*G05D 1/02*　　(2020.01)
　　*G05B 19/418*　　(2006.01)
　　*B07C 3/08*　　(2006.01)
　　*B65G 67/02*　　(2006.01)
　　*B66F 9/06*　　(2006.01)
　　*B25J 9/16*　　(2006.01)

(52) U.S. Cl.
　　CPC ............... *B07C 3/08* (2013.01); *B65G 67/02* (2013.01); *B66F 9/063* (2013.01); *G01C 21/343* (2013.01); *G05B 19/41895* (2013.01); *G05D 1/02* (2013.01); *B07C 2501/0063* (2013.01); *B25J 9/1664* (2013.01); *B25J 9/1674* (2013.01)

(56) References Cited

U.S. PATENT DOCUMENTS

| | | | | |
|---|---|---|---|---|
| 10,303,171 | B1* | 5/2019 | Brady | G08G 1/207 |
| 10,968,087 | B2* | 4/2021 | Zhu | B07C 3/008 |
| 2013/0302132 | A1 | 11/2013 | D'Andrea | |
| 2017/0011333 | A1* | 1/2017 | Greiner | G06Q 10/083 |
| 2017/0039510 | A1* | 2/2017 | Ogilvie | G06Q 50/28 |
| 2017/0183158 | A1* | 6/2017 | Zhu | G06Q 10/083 |
| 2018/0155011 | A1* | 6/2018 | Greiner | B64C 27/20 |
| 2018/0186454 | A1* | 7/2018 | Luckay | G05D 1/0094 |
| 2018/0189716 | A1* | 7/2018 | Crone | G06Q 10/047 |
| 2018/0208398 | A1* | 7/2018 | Haveman | B66F 9/24 |
| 2018/0246526 | A1* | 8/2018 | Wilkinson | G05D 1/0291 |
| 2018/0264520 | A1* | 9/2018 | Zhu | G06Q 10/083 |
| 2018/0273297 | A1* | 9/2018 | Wagner | B65G 1/0478 |
| 2019/0031075 | A1* | 1/2019 | Koch | B60P 1/6481 |
| 2019/0066038 | A1* | 2/2019 | O'Brien | G05D 1/0297 |
| 2019/0126323 | A1* | 5/2019 | Futch | B65G 1/065 |
| 2019/0236741 | A1* | 8/2019 | Bowman | B60L 53/80 |
| 2019/0276236 | A1* | 9/2019 | Wu | B65G 1/0407 |

FOREIGN PATENT DOCUMENTS

| | | |
|---|---|---|
| CN | 107855284 A | 3/2018 |
| CN | 107943017 A | 4/2018 |
| CN | 207249487 U | 4/2018 |
| EP | 1204491 A1 | 5/2002 |
| JP | H07225614 A | 8/1995 |
| JP | H0830328 A | 2/1996 |
| JP | 2013067517 A | 4/2013 |
| JP | 5557476 B2 | 7/2014 |
| JP | 2015522493 A | 8/2015 |
| JP | 2016113291 A | 6/2016 |
| WO | 0112347 A1 | 2/2001 |
| WO | 2016178348 A1 | 11/2016 |

OTHER PUBLICATIONS

International Search Report for PCT/CN2017/115751 dated Jun. 26, 2018, with English Translation.

* cited by examiner

PARCEL DROPPING METHOD, SORTING ROBOT AND SORTING SYSTEM

CROSS-REFERENCES TO RELATED APPLICATIONS

This is a U.S. National Stage Application of International Patent Application No. PCT/CN2017/115751, filed on Dec. 12, 2017, which claims priority to Chinese Patent Application No. 201710919964.X, filed on Sep. 30, 2017, the contents of which are incorporated herein by reference in their entireties.

TECHNICAL FIELD

The present application relates to the field of parcel sorting techniques and, in particular, to a parcel dropping method, a sorting robot and a sorting system.

BACKGROUND

The parcel sorting robot system is a logistics sorting system created according to national conditions and geographical factors of our country and in overall consideration of a balance between costs of manpower in labor-intensive industries and costs of precise and complex automation equipment in our country. With the instant response feature of robots and the flexibility of the distributed system, the parcel sorting robot system can significantly reduce the overall costs of parcel sorting.

In the conventional parcel sorting robot system, when a robot needs to deliver a parcel to, for example, a separate opening or a temporary parcel storage container, the robot needs to decelerate until the robot stands still, deliver the parcel when the robot is stationary, and then accelerate and move away from the delivery point after the delivery is completed. When such delivery mode is used, in addition to a long delivery time, factors affecting the system efficiency include that when the robot in the stationary state delivers the parcel, other robots that plan to pass through the same position are blocked by the robot. In addition, robots that stop temporarily in the field interact with each other, causing a chain effect and reducing the average speed of sorting robots.

SUMMARY

In view of this, a parcel dropping method for a sorting robot system, a sorting robot, and a sorting system are provided in the present application. This method greatly increases the sorting efficiency by allowing the robot to deliver a parcel when the robot is in motion.

A parcel dropping method for a parcel sorting system is provided in the present application. The method includes providing a conveying device; operating the conveying device to receive a parcel and move towards a delivery target; and delivering, by the conveying device, the parcel to the delivery target after the conveying device moves to a delivery region. The motion speed of the conveying device is not equal to zero when the conveying device delivers the parcel.

In one embodiment, the parcel dropping method further includes determining whether a condition for delivering the parcel when the conveying device is in motion is satisfied; and in condition that the condition is satisfied, delivering, by the conveying device, the parcel to the delivery target after the conveying device moves to the delivery region.

In one embodiment, whether the condition for delivering the parcel when the conveying device is in motion is satisfied is determined by at least one of the conveying device, a control system or another conveying device.

In one embodiment, the delivering, by the conveying device, the parcel to the delivery target after the conveying device moves to the delivery region includes: delivering, by the conveying device, the parcel to the delivery target during a uniform motion.

In one embodiment, the operating the conveying device to receive the parcel and move towards the delivery target includes: calculating a delivery distance and a delivery speed according to a size parameter of a to-be-delivered parcel and a size parameter of the delivery target so that the conveying device delivers the parcel to the delivery target at the delivery speed in the delivery distance.

In one embodiment, the conveying device moves in a first direction in parallel with the delivery target.

In one embodiment, a speed v at which a robot passes by the delivery target satisfies $$v = \frac{a_1 - a_2}{\sqrt{\frac{2(\Delta h + h_2 - h_0)}{g}}};$$

and when a delivery device is started, a distance s from the conveying device to a front edge of the delivery target satisfies $$s = v \cdot (t_0 + t_1) = \frac{a_1 - a_2}{\sqrt{\frac{2(\Delta h + h_2 - h_0)}{g}}} \cdot \left(t_0 + \sqrt{\frac{2(h_1 - h_2)}{g}}\right).$$

$a_1$ denotes an opening size of the delivery target in the first direction, $a_2$ denotes a maximum side length of the parcel, $\Delta h$ denotes a maximum height of the parcel, $h_2$ denotes a vertical height from a highest point of an edge of the delivery target to ground, $h_1$ denotes a vertical height from the parcel to a motion ground when the parcel is dropped from the conveying device, and $h_0$ denotes a minimum safe delivery height from which the parcel reaches an inside of a target container when the parcel is delivered to the target container.

In one embodiment, the first direction is consistent with a direction in which the delivery target has a largest opening size.

In one embodiment, the method further includes: after the conveying device passes by the delivery target, operating the conveying device to turn 90° or 180° along an arc when the conveying device is in motion so that the conveying device returns to a pickup region.

In one embodiment, the conveying device moves towards the delivery target in a first direction and returns to a pickup region in a second direction that is different from the first direction after delivering the parcel.

In one embodiment, the conveying device moves towards the delivery target along a first arc-shaped curve and returns to a pickup region along a second arc-shaped curve after delivering the parcel.

In one embodiment, the first arc-shaped curve and the second arc-shaped curve form an axisymmetric structure.

In one embodiment, the method further includes: in condition that the condition is not satisfied, operating the conveying device to stop moving and deliver the parcel to the delivery target when the conveying device is stationary.

In another aspect of the present application, a sorting robot is provided. The sorting robot includes a control unit, a drive unit and a delivery unit. The drive unit is configured to drive the sorting robot to move towards a delivery position after the sorting robot receives a parcel in a pickup region. The control unit is configured to control the delivery unit to deliver, at the delivery position, the parcel to a delivery target when the sorting robot moves to the delivery position. The motion speed of the sorting robot is not equal to zero when the sorting robot delivers the parcel.

In one embodiment, the sorting robot further includes a detection unit configured to detect whether an obstacle exists at the delivery position.

In one embodiment, the control unit is configured after the sorting robot receives the parcel, to calculate a delivery distance and a delivery speed according to a size parameter of a to-be-delivered parcel and a size parameter of the delivery target so that the control unit controls the delivery unit to deliver the parcel to the delivery target at the delivery speed in the delivery distance.

In one embodiment, the sorting robot further includes a receiving unit configured to receive the size parameter of a to-be-delivered parcel and a size parameter of the delivery target.

In one embodiment, after the sorting robot passes by the delivery target, the control unit is configured after the sorting robot passes by the delivery target, to control the drive unit to drive the sorting robot to turn 90° or 180° along an arc when the sorting robot is in motion so that the sorting robot returns to the pickup region.

In another aspect of the present application, a parcel sorting system is provided. The system includes a parcel supply region, which is configured to distribute a to-be-sorted item; a conveying region, in which at least one conveying device moves, where the conveying device is configured to convey the to-be-sorted item through the conveying region; and a parcel dropping region, in which the conveying device drops the to-be-sorted item to a corresponding sorting target, where parcel dropping region includes a plurality of sorting targets. The conveying device is further configured to determine whether the parcel dropping region satisfies the condition for parcel dropping when the conveying device is in motion; and in condition that the condition is satisfied, the conveying device drops the to-be-sorted item to the corresponding sorting target when the conveying device is in motion.

In one embodiment, at least one of the conveying device, a control system or another conveying device is configured to determine whether the parcel dropping region satisfies a condition for parcel dropping when the conveying device is in motion or the control system is configured to determine whether the parcel dropping region satisfies the condition for parcel dropping when the conveying device is in motion; and in condition that the condition is satisfied, the conveying device drops the to-be-sorted item to the corresponding sorting target when the conveying device is in motion.

In one embodiment, the conveying device calculates a delivery distance and a delivery speed according to a size parameter of a to-be-delivered parcel and a size parameter of the delivery target so that the control unit controls the delivery unit to deliver the parcel to the delivery target at the delivery speed in the delivery distance.

In one embodiment, the item sorting system further includes a turning region. After the conveying device passes by the corresponding sorting target and reaches the turning region, the conveying device turns 90° or 180° along an arc when the conveying device is in motion so that the conveying device returns to a pickup region.

In the parcel delivery method provided in embodiments of the present application, a conveying device delivers a parcel to a delivery target when the conveying device is in motion, greatly improving the parcel sorting efficiency and reducing the energy loss of, for example, a sorting robot.

DETAILED DESCRIPTION

Solutions in embodiments of the present application will be described clearly and completely in connection with the drawings in embodiments of the present application. Apparently, the embodiments described below are merely part, not all, of embodiments of the present application. Based on the embodiments described herein, other embodiments obtained by those of ordinary skill in the art on the premise that no creative work is done are within the scope of the present application.

Figure 1:
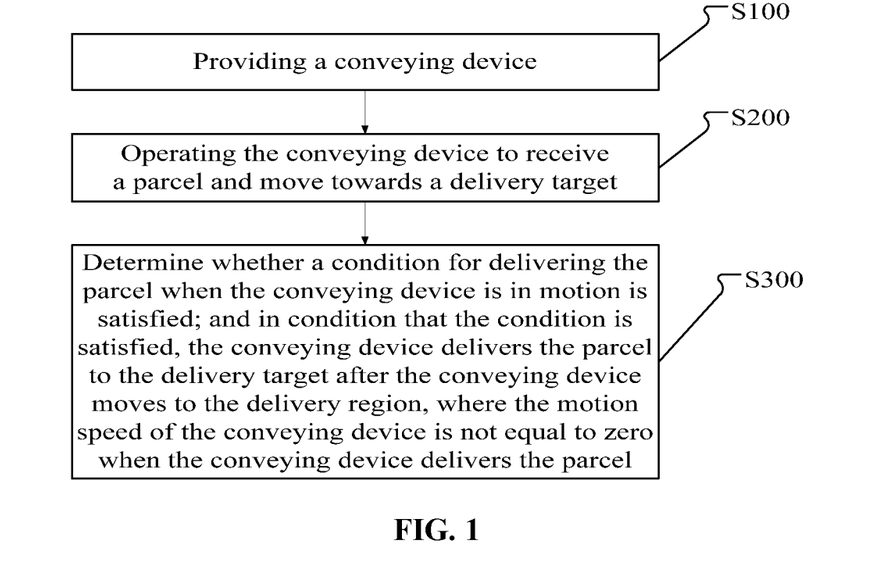
FIG. 1 is a flowchart of a parcel dropping method according to an embodiment of the present application.

A parcel dropping method for a parcel sorting system is provided in the present application. Referring to FIG. 1, the method includes the steps described below.

In S100, a conveying device is provided.

In S200, the conveying device receives a parcel and moves towards a delivery target.

In S300, it is determined whether a condition for delivering the parcel when the conveying device is in motion is satisfied; and in condition that the condition is satisfied, the conveying device delivers the parcel to the delivery target after the conveying device moves to the delivery region. The motion speed of the conveying device is not equal to zero when the conveying device delivers the parcel. In the parcel delivery method provided in the present application, a sorting robot delivers a parcel when the sorting robot is in motion, thereby improving the parcel sorting efficiency.

For ease of description, the present application is described below in a way that a sorting robot instead of a transport device is described. However, it is to be understood by those skilled in the art that the conveying device in the present application may not only be a sorting robot but also be other devices that can carry and deliver a parcel.

Usually, multiple sorting robots may be provided. To reduce the motion distances of the sorting robots, for example, the robots may be divided into several groups and robots in each group may move in a fixed region, thereby preventing the robots from moving throughout the field and reducing the probability of mutual influence. Further, primary and secondary motion routes may be configured for a single sorting robot. Usually, a sorting robot moves along a primary route to the delivery target and returns to the pickup region along another primary route. In condition that primary routes are damaged or blocked and the sorting robot cannot move, the robot may move along its secondary routes. In addition, the path control and optimization of different sorting robots may be achieved by cooperation between a control system and the sorting robots. For example, the control system may configure the motion route of a sorting robot and sending a control signal to the sorting robot. When receiving the signal, the sorting robot may move according to the signal. The robot is provided with, for example, a sensor for detecting the condition of the motion field. If an obstacle is encountered, the data may be sent to the control system so that the control system can re-plan the motion routes of one or more sorting robots on this basis.

The motion platform of the sorting robot may be a suspended steel platform structure so that the delivery target may be a separate opening of the steel platform. For example, openings may be distributed over the steel platform. The sorting robot may move on the ground so that the delivery target may be a temporary parcel storage container disposed on the ground. For example, the temporary parcel container may be disposed on the periphery of the motion ground of the sorting robot. For example, the parcel conveying device may be in the middle. Thus, the operator can place the parcel on a sorting robot that is on standby. After receiving the parcel, the robot can move to an appropriate position near the delivery target and deliver the parcel to the delivery target. A pressure sensor may be disposed on one side of the sorting robot so that after receiving the parcel, the pressure sensor can sense a parcel placement signal so that the pressure sensor can send a motion signal to its braking system so that the sorting robot can move towards the delivery target along a certain route.

The condition for delivering the parcel when the sorting robot is in motion includes that no other sorting robots block the motion of the sorting robot in the delivery region and the surface of the delivery region or the surface of the platform does not have damage that may affect the motion of the sorting robot. As mentioned earlier, when a sorting robot fails, the sorting robot is forced to stop in the robot's motion field. The position where the sorting robot temporarily stops may be the routes that other robots must take. At this time, other sorting robots have to circumvent this route. In this process, some robots may stop at the delivery region of the preceding robot. As a result, the preceding sorting robot is configured to stop moving. In addition, the determination may be completed by the sorting robot itself, may be completed by the control system, may be completed by another sorting robot interacting with this sorting robot, or may, of course, be completed by a combination of these methods.

As will be appreciated by those skilled in the art, a sorting robot is typically provided with a system for preventing collisions. For example, the sorting robot may be provided with a detection sensor for detecting if there are other obstacles, including other sorting robots, in front of the sorting robot. A microprocessor may be disposed inside the sorting robot so that when the sensor detects an obstacle, the sensor transmits the detection data to the microprocessor. The microprocessor can calculate the distance from the obstacle according to this. Once the distance is less than the threshold, for example, the microprocessor can send a motion stopping signal to the drive system of the sorting robot so that the sorting robot stops moving to avoid damage to the sorting robot caused by collision with the obstacle.

In one embodiment, delivering, by the sorting robot, the parcel to the delivery target after the sorting robot moves to the delivery region includes: delivering, by the sorting robot, the parcel to the delivery target during a uniform motion. Usually, when the sorting robot receives the parcel in the pickup region, the sorting robot can turn itself according to the predetermined route such that the sorting robot is pointed towards the delivery position of the delivery region. In this way, the sorting robot can move at a constant speed throughout the process, reducing the energy consumption caused by deceleration, acceleration or turning. For example, after receiving a parcel, each sorting robot can be pointed towards the corresponding delivery region, move to the delivery region along a straight line at a constant speed and directly deliver the parcel to the corresponding delivery target. For example, the delivery region may be a position that is located on one side of the delivery target but has a certain distance from the delivery target. This position may be determined by factors such as the size of the delivery target, the height of the sorting robot, the overall height of the parcel after the parcel is placed on the sorting robot, the distance from the parcel to the delivery target, and the delivery direction and the capability of the delivery device on the sorting robot.

In one embodiment, operating the sorting robot to receive the parcel and move towards the delivery target includes: calculating a delivery distance and a delivery speed of the sorting robot according to a size parameter of a to-be-delivered parcel and a size parameter of the delivery target so that the sorting robot delivers the parcel to the delivery target at the delivery speed in the delivery distance. For example, first, the size of the parcel should be less than the size of the opening of the delivery target to ensure that the parcel can be delivered into the delivery target. In addition, the size of the parcel in the direction in which the parcel moves when the parcel is delivered should be less than the size of the delivery target in this direction. In addition, in this motion direction, the delivered parcel has both a forward speed and a falling speed like the sorting robot. Apparently, during the time when the parcel falls to the upper edge of the delivery target, the front end of the parcel in the motion direction cannot move beyond the delivery target. Otherwise, the parcel may not fall into the delivery target. For example, the delivery timing of the sorting robot may be such that the center of gravity of the parcel just reaches a position that coincides with the rear edge of the delivery target in this motion direction so that it is better ensured that the parcel can fall into the delivery target. Further, the time when the parcel falls to the lower surface and is aligned with the upper edge of the delivery target may be calculated so that a first distance covered by the parcel in the motion direction during this time, that is, the distance covered by the center of gravity of the parcel, can be obtained from the motion speed of the sorting robot multiplied by this time. Thus, the delivery position may be the position at which the distance from the rear edge of the delivery target to the center of gravity of the parcel carried by the sorting robot in this motion direction is the first distance. In this embodiment of the present application, the delivery position of the sorting robot is calculated so that it is better ensured that the parcel falls into the delivery target and the reliability of parcel delivery is improved.

In one embodiment, the sorting robot moves in a first direction in parallel with the delivery target. Since the sorting robot moves in parallel with the delivery target, during the motion of the sorting robot, the sorting robot can pass through the parcel delivery region without turning and complete delivery of the parcel, thereby reducing the energy consumption.

Figure 2:
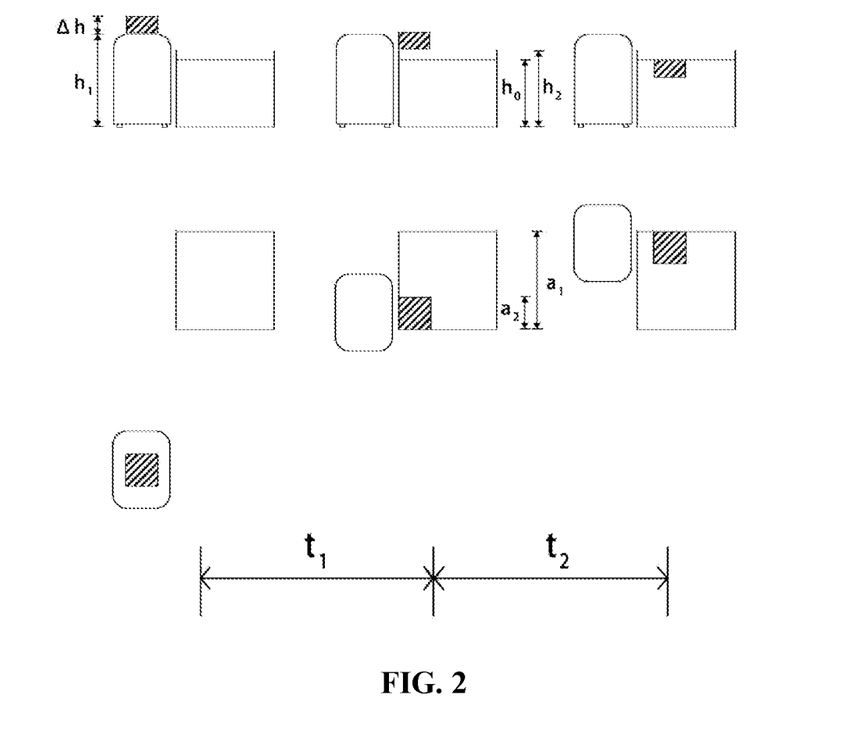
FIG. 2 is a schematic diagram showing a parcel dropping process and related parameters according to an embodiment of the present application.

The following describes the method for calculating the motion speed and the starting delivery distance (the delivery target is the target container in this embodiment) of the sorting robot when the robot delivers the parcel during a uniform motion. Referring to FIG. 2 (the sorting robot is disposed at left side, the shadow portion with lines is the parcel carried by the sorting robot, the container is disposed at right side), the process relates to the following parameters: the time from the moment the parcel is delivered to the moment the rear edge of the parcel falls into the front edge of the target container is $t_1$, and the predicted vertical height of the parcel needs to be higher than the maximum height of the target container in this case; the time from the moment the rear edge of the parcel falls into the front edge of the target container to the moment the front edge of the parcel reaches the rear edge of the target container is $t_2$, and the predicted vertical height of the parcel needs to be lower than the lowest safety height; the time from the moment the sorting robot starts the parcel delivery device to the moment the parcel breaks away from the sorting robot is $t_3$; the speed at which the sorting robot passes through the separate opening for the target container is v; the minimum safe delivery height from which the parcel reaches the inside of the target container when the parcel is delivered to the target container is $h_0$ (a height higher than $h_0$ may cause the parcel to bounce out of the target container range); the vertical height from the parcel to the ground when the parcel breaks away from the sorting robot is $h_1$; the vertical height from the highest point of the edge of target container to the ground is $h_2$; the maximum height of the parcel is $\Delta h$; the side length of the target container is $a_1$; the maximum side length of the parcel is $a_2$.

Thus, the timing at which the sorting robot starts to drive the delivery device to deliver the parcel is calculated as described below.

When there is enough space in front of the sorting robot to allow the sorting robot to move beyond the target container at a constant speed:

During $t_1$, the parcel falling height is $h_1 - h_2 = \frac{1}{2}gt_1^2$. During $t_2$, the parcel falling height is $\Delta h + h_2 = \frac{1}{2}gt_2^2$. Where g denotes the gravitational acceleration.

Thus, the calculation result for the two periods of time is as follows:

$$\begin{cases} t_1 = \sqrt{\dfrac{2(h_1 - h_2)}{g}} \\ t_2 = \sqrt{\dfrac{2(\Delta h + h_2)}{g}} \end{cases}.$$

Thus, the relationship between the speed and the time when the sorting robot passes through the separate opening is as follows: $a_1 - a_2 = vt_2$.

The speed at which the sorting robot passes through the separate opening is $$v = \frac{a_1 - a_2}{\sqrt{\dfrac{2(\Delta h + h_2 - h_0)}{g}}}.$$

When the delivery device is started, the distance s from the front edge of the separate opening to the sorting robot should be:

$$s = v \cdot (t_0 + t_1) = \frac{a_1 - a_2}{\sqrt{\dfrac{2(\Delta h + h_2 - h_0)}{g}}} \cdot \left( t_0 + \sqrt{\dfrac{2(h_1 - h_2)}{g}} \right).$$

In this embodiment, the speed v at which the sorting robot passes through the delivery target satisfies:

$$v = \frac{a_1 - a_2}{\sqrt{\dfrac{2(\Delta h + h_2 - h_0)}{g}}}.$$

When the delivery device is started, the distance s from the sorting robot to the front edge of the delivery target satisfies:

$$s = v \cdot (t_0 + t_1) = \frac{a_1 - a_2}{\sqrt{\dfrac{2(\Delta h + h_2 - h_0)}{g}}} \cdot \left( t_0 + \sqrt{\dfrac{2(h_1 - h_2)}{g}} \right).$$

$a_1$ denotes an opening size of the delivery target in the first direction, $a_2$ denotes a maximum side length of the parcel, $\Delta h$ denotes a maximum height of the parcel, $h_2$ denotes a vertical height from a highest point of an edge of the delivery target to ground, $h_1$ denotes a vertical height from the parcel to a motion ground when the parcel is dropped from the conveying device.

In this embodiment of the present application, an appropriate delivery timing is selected according to the motion speed of the sorting robot so that the parcel can be delivered into the delivery target more precisely and the reliability of parcel delivery is improved.

In one embodiment, the first direction is consistent with a direction in which the delivery target has a largest opening size. For example, the opening direction of the delivery target can be configured according to the conventional motion speed of the sorting robot such that the direction in which the opening size of the delivery target is the largest is consistent with the motion direction of the soring robot so that it is possible to reduce the difficulty in parcel delivery and improve the success rate of parcel delivery by extending the time period from the moment when the parcel is delivered to the moment when the parcel falls into the delivery target.

Further, it is also possible to prevent the parcel from flying out of the delivery target by providing a blocking device at the front edge of the delivery target (the front edge of the delivery target is the front end of the delivery target in the preceding motion direction). For example, the height of the blocking device may be greater than or equal to the maximum distance from the parcel to the motion field of the sorting robot, thereby ensuring that the parcel can fall into the opening for the delivery target as long as the parcel is delivered when the sorting robot does not move beyond the front edge of the delivery target, thereby greatly reducing the requirements for delivery speed and timing. In this case, the selection of delivery timing mainly affects the smoothness of parcel falling. For example, if the delivery timing is well selected, the parcel does not touch the front and rear edges of the delivery target in the motion direction when the parcel is falling. In this way, the parcel delivery effect is good. Otherwise, if the delivery timing is not well selected, the parcel touches the front and rear edges of the delivery target in the motion direction or the side wall of the front end of the delivery target in the motion direction when the parcel is falling. If the delivery timing is too early, the lower edge of the parcel may touch the rear edge of the delivery target, and thus the underside of the parcel may be damaged. If the delivery timing is too late, the front end of the parcel may hit the front side wall of the blocking device or the front side wall of the delivery target, and thus the front end of the parcel may be damaged. If the parcel is fragile, the delivery timing may be precisely selected to avoid a collision between the parcel and the delivery target. For selection of delivery timing, see the previous calculation method.

Figure 3A:
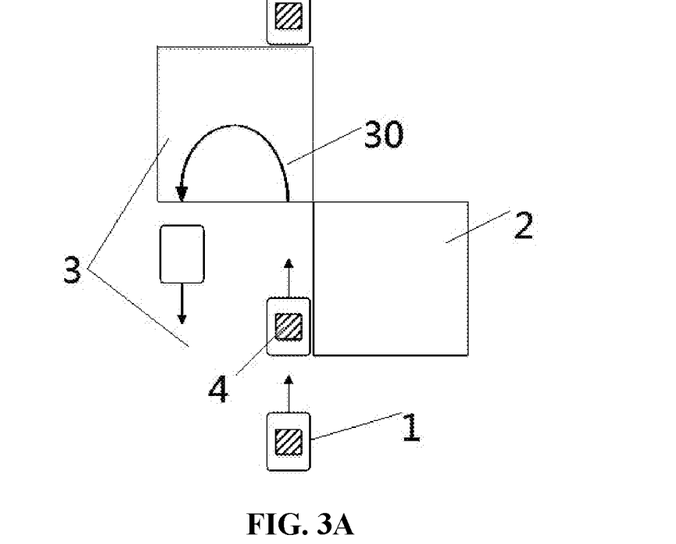
FIGS. 3A to 3D are schematic diagrams illustrating turning of a sorting robot after the sorting robot delivers a parcel.
Figure 3B:
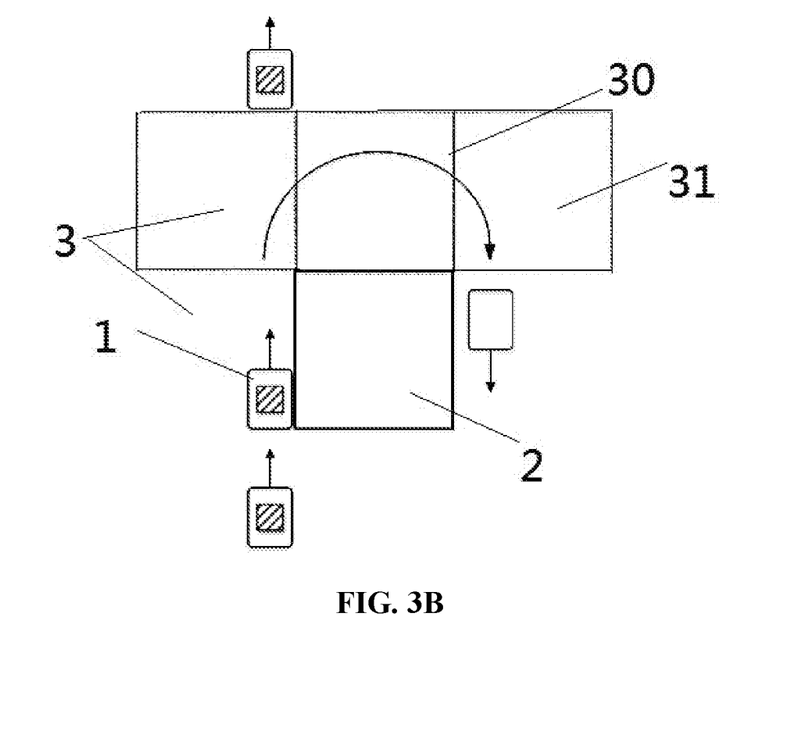
Figure 3C:
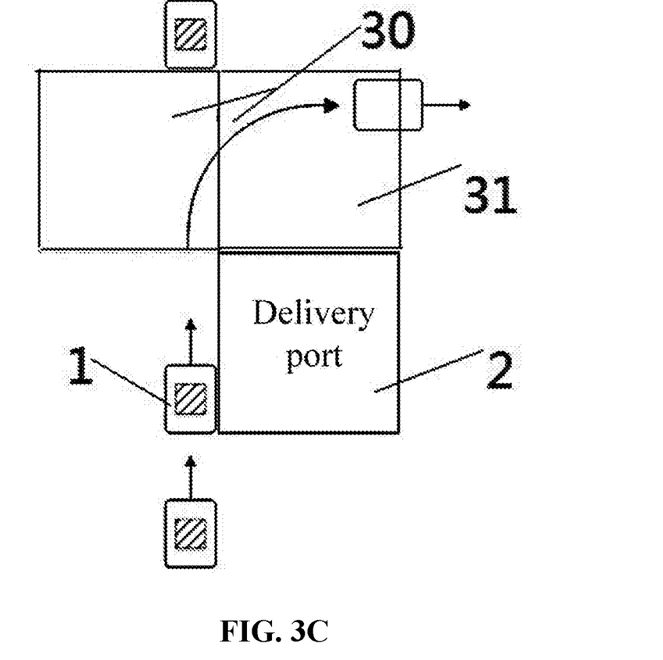
Figure 3D:
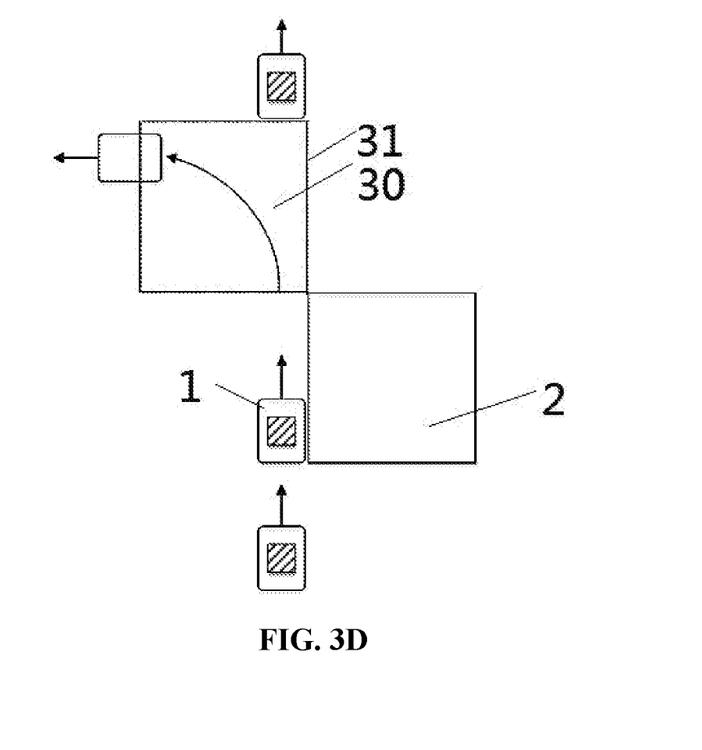

Referring to FIGS. 3A to 3D, the sorting robot 1 delivers the parcel 4 when walking straight on the left side of the delivery port 2 (as shown in the figure) and along the motion field 3. After completing the delivery, the sorting robot 1 can continue to move to the turning region 30 so that the sorting the robot 1 can turn at an angle in the arc turning region 30. For example, referring to FIGS. 3A and 3B, in the arc turning region 31, the sorting robot 1 may make a 180° turn to the left or right along an arc so as to return to the pickup region. For example, as shown in FIG. 3A, after entering the arc turning region 30, the sorting robot 1 can make a U-turn on the same side (the left side of the delivery port in the figure) within one square 31. For example, as shown in FIG. 3B, after entering the arc turning region 30, the sorting robot 1 needs to make a U-turn to the other side (the right side of the delivery port in the figure) within, for example, three squares 31. Referring to FIGS. 3C and 3D, after the sorting robot 1 delivers the parcel 4 and passes by the delivery target 2, the sorting robot 4 may make a 90° turn to the right or to the left along an arc so as to return to the pickup region. For example, as shown in FIG. 3C, when the sorting robot 1 makes a 90° turn to the right along an arc, the turning can be completed within two squares 31; when the sorting robot 1 is configured to make a 90° turn to the left along an arc, the turning can be completed within one square 31. In this embodiment of the present application, the sorting robot makes a turn along an arc so that the robot can complete the turning during motion, thereby reducing the operations of stopping, turning and re-acceleration, reducing the time during which the sorting robot returns to the pickup region and improving the sorting efficiency. In addition, the sorting robot does not need to stop before making a turn, so as not to occupy the motion field of other sorting robots and not to affect the motion of other sorting robots, thereby improving the use of the sorting field.

In this embodiment, the turning angle of the sorting robot 1 may be determined by the pickup region assigned to the sorting robot 1. Moreover, with the increase or decrease of the directions of parcels 4, the pickup region where the sorting robot 1 is located can be dynamically adjusted so that the sorting robot 1 can make an arc turn by a different angle so as to return to a reallocated pickup region. For example, the initial route of a sorting robot 1 is to, after the robot completes delivery of the parcel 4 and enters the arc turning region 30, make a 90° turn to the left along an arc and then move straight to the preset pickup region. As the sorting work progresses, the number of pickup regions in this area is gradually reduced, but the parcel load in other pickup regions is still heavy. In this case, it is feasible to send the sorting robot 1 an instruction like making a 180° turn to the right so that the sorting robot 1 enters other pickup regions to assist other robots. In addition, although a 90° or 180° arc turn of the sorting robot is used as an example in the preceding embodiment, the turning angle of the sorting robot can be adjusted as needed and is not limited in the present application.

In one embodiment, the sorting robot moves towards the delivery target along a first arc-shaped curve and returns to the pickup region along a second arc-shaped curve after delivering the parcel. This embodiment differs from the previous embodiment in that the sorting robot also moves along an arc before delivering the parcel and can complete parcel delivery at the end of the arc (the position closest to the delivery target); and then, the sorting robot returns to the pickup region along the second arc-shaped curve.

Figure 4:
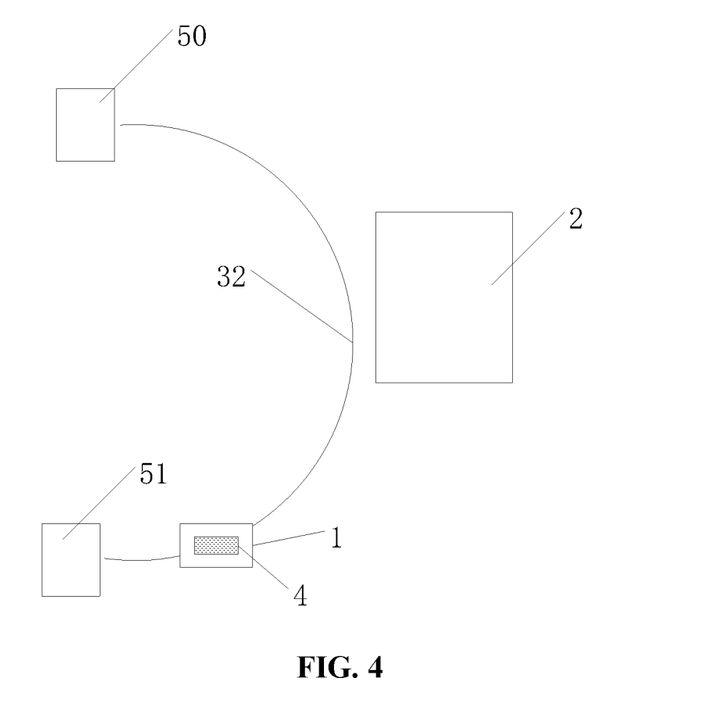
FIG. 4 is a schematic diagram illustrating that a sorting robot moves along a semicircle and delivers a parcel.

In this embodiment, for example, the first arc-shaped curve and the second arc-shaped curve form an axisymmetric structure. For example, referring to FIG. 4, the motion route of the sorting robot 1 may be a semicircle, and the two end points of the semicircle are two pickup regions 50 and 51. For example, the point on the symmetry axis of the semicircle is the point 32 that is closest to the delivery target. The point 32 may serve as, for example, the position at which the sorting robot 1 delivers the parcel 4. In this case, the sorting robot 1 may repeatedly move along the semicircular line. The robot may move from the pickup region 50 at one end point of the semicircular line to the pickup region 51 at the other end point of the semicircular line, and deliver the parcel 4 to the delivery target 2 each time the robot passes through the symmetry point of the semicircular line. It can be seen that the sorting robot 1 moves in opposite directions when two adjacent parcels are delivered.

In the parcel delivery method provided in embodiments of the present application, the sorting robot completes parcel delivery and returns to the pickup region in the process of continuous motion, thereby reducing the operations of stopping, turning and re-acceleration of the sorting robot, greatly improving the utilization rate of the sorting field, reducing the energy consumption of the sorting robot and improving the precision and the efficiency of sorting.

In one embodiment, the method further includes: in condition that the condition is not satisfied, operating the sorting robot to stop moving and deliver the parcel to the delivery target when the sorting robot is stationary. For example, when the sorting robot detects that there is no enough space in front of the sorting robot to allow the robot to move to the delivery region, the sorting robot should first be stopped and then deliver the parcel when the robot is stationary at the delivery point. This is because other robots, such as a malfunctioning robot or a robot that is using the delivery point as a turning region, may block the motion route before the sorting robot reaches the delivery point. In this case, the robot should adopt the conventional delivery method. That is, after the robot stops at the position of the delivery point, the parcel delivery device is started so that the parcel can be delivered to the delivery target. Through this embodiment, smooth delivery of the parcel is ensured in the case where an obstacle exists in the delivery region and causes the sorting robot unable to complete parcel delivery when the robot is in motion.

It is to be noted that the roadblock detection and the motion state change in the present application may be separately performed by the sorting robot (in this case, the sorting robot may be equipped with, for example, a detection device and a processing device so that the processing device can determine the motion mode of the sorting robot according to the detected signal); may be scheduled by a comprehensive control system for multiple sorting robots (for example, a uniform detector is disposed above the sorting robot to detect the motion state of the robot, and the detector may transmit the motion state of the sorting robot to the control system); or may be implemented by the sorting robot and the comprehensive control system in cooperation (for example, the sorting robot is equipped with a detection device and transmits the detection result to the control system, and the control system is used for transmitting a motion control instruction to the sorting robot).

In the parcel delivery method provided in embodiments of the present application, a sorting robot delivers a parcel to a delivery target when the sorting robot is in motion, greatly improving the parcel sorting efficiency and reducing the energy loss of the sorting robot.

Figure 5:
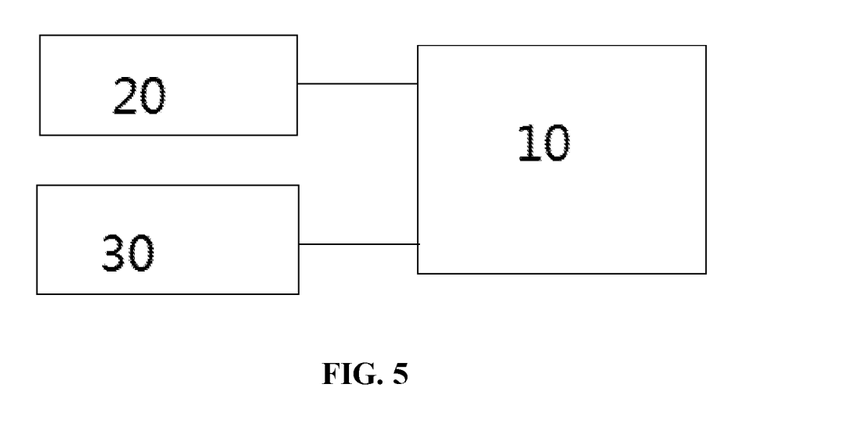
FIG. 5 is a block diagram of a sorting robot according to an embodiment of the present application.

In another aspect of the present application, a sorting robot is provided. Referring to FIG. 5, the sorting robot includes a control unit 10, a drive unit 20 and a delivery unit 30. The drive unit 20 is configured after the sorting robot receives a parcel in a pickup region, to drive the sorting robot to move towards a delivery position. The control unit 10 is configured to determine whether the delivery position satisfies a condition for delivering the parcel when the sorting robot is moving. In condition that the condition is satisfied, the control unit 10 is configured to control the delivery unit 30 to deliver, at the delivery position, the parcel to a delivery target when the sorting robot moves to the delivery position. With the sorting robot provided in the present application, parcel dropping is achieved in motion and the parcel sorting efficiency is improved.

Figure 6:
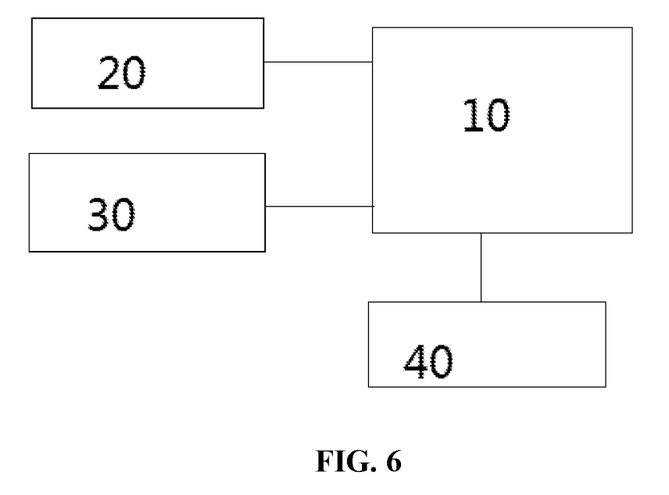
FIG. 6 is a block diagram of a sorting robot according to another embodiment of the present application.

Referring to FIG. 6, in one embodiment, the sorting robot further includes a detection unit 40 configured to detect whether an obstacle exists at the delivery position. For example, the detection unit 40 may be an infrared detection device or a Doppler detection device. Further, the detection unit 40 may transmit a detected signal to the control unit 10 so that the control unit 10 may determine the distance from the sorting robot to the obstacle according to the detected signal so that it can be predicted whether the sorting robot will collide with the obstacle if the sorting robot moves at the current speed.

In one embodiment, the control unit 10 is configured after the sorting robot receives the parcel, to calculate a delivery distance and a delivery speed according to a size parameter of a to-be-delivered parcel and a size parameter of the delivery target so that the control unit 10 controls the delivery unit 30 to deliver the parcel to the delivery target at the delivery speed in the delivery distance. As mentioned earlier, when the robot delivers the parcel when the robot is in motion, the dropped parcel has both a forward speed and a falling speed. Thus, the motion route of the parcel is similar to a parabola. The control unit 10 may calculate the delivery distance according to the size of the delivery target in the delivery direction and the motion speed of the sorting robot when the parcel is delivered, so as to ensure that the parcel falls precisely into the delivery target.

In one embodiment, the sorting robot further includes a receiving unit configured to receive the size parameter of the to-be-delivered parcel and the size parameter of the delivery target. For example, the size parameter of the preceding to-be-delivered parcel and the size parameter of the delivery target may be sent to a receiving unit from outside. Usually, parcels have similar sizes and temporary parcel storage containers have consistent sizes. Size information is sent to the sorting robot by using an external device so that the measurement requirements of the sorting robot can be reduced.

In some embodiments, for example, size labels may be pasted to related delivery target and delivery parcel, and the preceding detection unit 40 of the sorting robot may be used for scanning the labels so as to read the size information of the parcel or the delivery target. The size information of a parcel and a delivery target are scanned by the sorting robot so that the precision of the size information is improved and that the parcel can be delivered to the delivery target can be better ensured.

In one embodiment, the control unit 10 is configured after the sorting robot passes by the delivery target, to control the drive unit to drive the sorting robot to turn 90° or 180° along an arc when the sorting robot is in motion so that the sorting robot returns to the pickup region. For example, the motion field of the sorting robot may be divided into a plurality of motion squares. It is feasible to paste a label to the turning region of the sorting robot in advance so that after a sorting robot completes delivery of a parcel to the target, the robot can determine, through scanning the label of the turning region, that the robot has reached the turning region. In this case, the control unit 10 can control the drive unit 20 to drive the sorting robot to make a turn to return to the pickup region and start the next pickup, conveying and delivery process.

In one embodiment, the control unit 10 may control the drive unit 20 to move to the delivery position along a first arc and to return to the pickup region along another arc after parcel delivery is completed in motion. For example, the motion route of the sorting robot may be a semicircle. For example, the motion route of the sorting robot may be a semicircle. The two end points of the semicircle are parcel pickup positions. The symmetry point of the semicircle is the position at which the sorting robot delivers the parcel.

Figure 7:
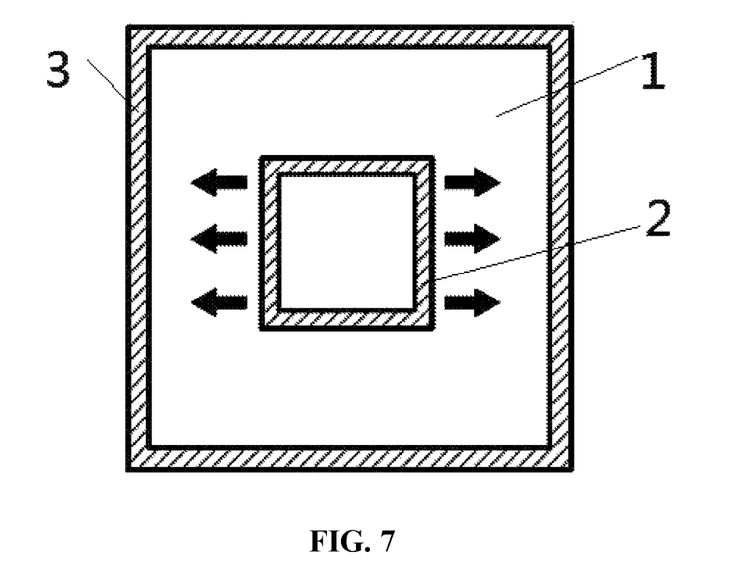
FIG. 7 is a schematic diagram of a sorting system according to an embodiment of the present application.

In another aspect of the present application, a parcel sorting system is provided. Referring to FIG. 7, the system includes a parcel supply region 2, which is configured to distribute a to-be-sorted item; a conveying region 1, in which at least one conveying device moves, where the conveying device is configured to convey the to-be-sorted item through the conveying region; and a parcel dropping region 3, in which the conveying device drops the to-be-sorted item to a corresponding sorting target, where parcel dropping region 3 includes a plurality of sorting targets. The conveying device is further configured to determine whether the parcel dropping region satisfies the condition for parcel dropping when the conveying device is in motion; and in condition that the condition is satisfied, the conveying device drops the to-be-sorted item to the corresponding sorting target when the conveying device is in motion. In the parcel sorting system provided in the present application, a sorting target is dropped when a conveying device is in motion so that the energy loss of the conveying device is reduced and the sorting efficiency is improved.

In one embodiment, the conveying device calculates a delivery distance and a delivery speed according to a size parameter of a to-be-delivered parcel and a size parameter of the delivery target so that the control unit controls the delivery unit to deliver the parcel to the delivery target at the delivery speed in the delivery distance. As mentioned earlier, when the robot delivers the parcel when the robot is in motion, the dropped parcel has both a forward speed and a falling speed. Thus, the motion route of the parcel is similar to a parabola. The control unit may calculate the delivery distance according to the size of the delivery target in the delivery direction and the motion speed of the sorting robot when the parcel is delivered, so as to ensure that the parcel falls precisely into the delivery target.

In one embodiment, the item sorting system further includes a turning region. After the conveying device passes by the corresponding sorting target and reaches the turning region, the conveying device turns 90° or 180° along an arc when the conveying device is in motion so that the conveying device returns to a pickup region.

As mentioned earlier, for example, in order for the sorting robot to precisely determine its position in the motion field, it is feasible to paste a label to the turning region of the sorting robot in advance so that after a sorting robot completes delivery of a parcel to the target, the robot can determine, through scanning the label of the turning region, that the robot has reached the turning region. In this case, the sorting robot can make a turn to return to the pickup region and start the next pickup, conveying and delivery process.

The preceding embodiments of the present application can be combined with each other and have corresponding technical effects.

The parcel dropping method provided in this embodiment of the present application is applicable to both a conventional steel platform structure and a ground dropping field.

The above are only preferred embodiments of the present application and are not intended to limit the present application. Any modifications, equivalent substitutions, and the like made in the spirit and the principle of the present application are within the scope of the present application.

What is claimed is:

1. A parcel dropping method for a parcel sorting system, comprising:
   operating a conveying device to receive a parcel and move towards a delivery target; and delivering, by the conveying device, the parcel to the delivery target after the conveying device moves to a delivery region, wherein a motion speed of the conveying device is not equal to zero when the conveying device delivers the parcel:
   wherein the operating the conveying device to receive the parcel and move towards the delivery target comprises:
   delivering, by the conveying device, the parcel to the delivery target at a determined delivery speed in a determined delivery distance, wherein the determined delivery distance and the determined delivery speed are calculated according to a size parameter of a to-be-delivered parcel and a size parameter of the delivery target.

2. The parcel dropping method of claim 1, wherein the delivering, by the conveying device, the parcel to the delivery target after the conveying device moves to the delivery region comprises:
   delivering, by the conveying device, the parcel to the delivery target during a uniform motion.

3. The parcel dropping method of claim 1, wherein the conveying device moves towards the delivery target in a first direction, and returns to a pickup region in a second direction that is different from the first direction after delivering the parcel.

4. The parcel dropping method of claim 1, further comprising:
   before the delivering, by the conveying device, the parcel to the delivery target, determining whether a delivering instruction for delivering the parcel is received; and
   wherein the delivering, by the conveying device, the parcel to the delivery target after the conveying device moves to a delivery region comprises:
   in condition that the delivering instruction is received, delivering, by the conveying device, the parcel to the delivery target after the conveying device moves to the delivery region.

5. The parcel dropping method of claim 1, further comprising:
   before the delivering, by the conveying device, the parcel to the delivery target, determining whether the delivery region satisfies a condition for delivering the parcel when the conveying device is in motion; and
   wherein the delivering, by the conveying device, the parcel to the delivery target after the conveying device moves to the delivery region comprises:
   in condition that the condition is satisfied, delivering, by the conveying device, the parcel to the delivery target after the conveying device moves to the delivery region.

6. The parcel dropping method of claim 5, further comprising:
   in condition that the delivery region is determined not to satisfy the condition is not satisfied by the conveying device, operating the conveying device to stop moving and deliver the parcel to the delivery target when the conveying device is stationary.

7. The parcel dropping method of claim 1, wherein the conveying device moves in a first direction in parallel with the delivery target.

8. The parcel dropping method of claim 7, wherein the first direction is configured to be an opening direction of the delivery target, so that a time period from a moment when the parcel is delivered to a moment when the parcel falls into the delivery target is extended; or
   wherein the method further comprises: after the conveying device passes by the delivery target, operating the conveying device to turn 90° or 180° along an arc when the conveying device is in motion so that the conveying device returns to a pickup region.

9. The parcel dropping method of claim 1, wherein the conveying device moves towards the delivery target along a first arc-shaped curve, and returns to a pickup region along a second arc-shaped curve after delivering the parcel.

10. The parcel dropping method of claim 9, wherein the first arc-shaped curve and the second arc-shaped curve form an axisymmetric structure.

11. An item sorting system, comprising:
    at least one conveying device;
    a parcel supply region, which is configured to distribute a to-be-sorted item;
    a conveying region, which is configured for the at least one conveying device to move inside;
    a parcel dropping region, wherein the parcel dropping region comprises a plurality of sorting targets; and
    wherein the at least one conveying device is configured to convey the to-be-sorted item through the conveying region, and the at least one conveying device is configured to deliver the to-be-sorted item to a corresponding sorting target of the plurality of sorting targets in the parcel dropping region when the conveying device is in motion:
    wherein the at least one conveying device is further configured to deliver a parcel to a delivery target at a determined delivery speed in a determined delivery distance, wherein the determined delivery distance and the determined delivery speed are calculated according to a size parameter of a to-be-delivered parcel and a size parameter of the delivery target.

12. The item sorting system of claim 11, wherein the conveying device is further configured to: determine whether the parcel dropping region satisfies a condition for delivering the to-be-sorted item when the conveying device is in motion, and in condition that the condition is satisfied, deliver the to-be-sorted item to the corresponding sorting target in the parcel dropping region when the conveying device is in motion.

13. The item sorting system of claim 11, further comprising: a control system, wherein the control system is configured to determine whether the parcel dropping region satisfies a condition for delivering the to-be-sorted item when the conveying device is in motion; and wherein in condition that the condition is satisfied, the control system is configured to transmit a delivering instruction, so that the conveying device delivers the to-be-sorted item to the corresponding sorting target in the parcel dropping region when the conveying device is in motion.

14. The item sorting system of claim 13, further comprising a turning region, wherein after the conveying device passes by the corresponding sorting target and reaches the turning region, the conveying device turns 90° or 180° along an arc when the conveying device is in motion so that the conveying device returns to a pickup region.

15. A sorting robot, comprising:
a drive unit, which is configured to drive the sorting robot to move towards a delivery position after the sorting robot receives a parcel in a pickup region;
a delivery unit, which is configured to deliver the parcel to a delivery target at the delivery position; and
a control unit, which is configured to control the delivery unit to deliver the parcel to the delivery target at a determined delivery speed in a determined delivery distance, wherein the determined delivery distance and the determined delivery speed are calculated according to a size parameter of a to-be-delivered parcel and a size parameter of the delivery target.

16. The sorting robot of claim 15, further comprising:
a detection unit, which is configured to detect whether an obstacle exists at the delivery position and inform a detection result to the control unit;
wherein the control unit is configured to: in condition that an existence of the obstacle is detected, control the drive unit to stop to drive the sorting robot, so that the sorting robot stops moving.

17. The sorting robot of claim 15, wherein the control unit is configured after the sorting robot passes by the delivery target, to control the drive unit to drive the sorting robot to turn 90° or 180° along an arc when the sorting robot is in motion so that the sorting robot returns to the pickup region.

18. A parcel dropping method for a parcel sorting system, comprising:
operating a conveying device to receive a parcel and move towards a delivery target; and delivering, by the conveying device, the parcel to the delivery target after the conveying device moves to a delivery region, wherein a motion speed of the conveying device is not equal to zero when the conveying device delivers the parcel;
wherein the conveying device moves towards the delivery target along a first arc-shaped curve, and returns to a pickup region along a second arc-shaped curve after delivering the parcel.

19. A sorting robot, comprising:
a drive unit, which is configured to drive the sorting robot to move towards a delivery position after the sorting robot receives a parcel in a pickup region;
a delivery unit, which is configured to deliver the parcel to a delivery target at the delivery position; and
a control unit, which is configured to control the delivery unit to deliver the parcel to the delivery target at the delivery position, wherein a motion speed of the sorting robot is not equal to zero when the sorting robot delivers the parcel;
wherein the control unit is configured to control the drive unit to drive the sorting robot to move towards the delivery target along a first arc-shaped curve, and return to the pickup region along a second arc-shaped curve after delivering the parcel.

20. An item sorting system, comprising:
at least one conveying device;
a parcel supply region, which is configured to distribute a to-be-sorted item;
a conveying region, which is configured for the at least one conveying device to move inside;
a parcel dropping region, wherein the parcel dropping region comprises a plurality of sorting targets; and
wherein the at least one conveying device is configured to convey the to-be-sorted item through the conveying region, and the at least one conveying device is configured to deliver the to-be-sorted item to a corresponding sorting target of the plurality of sorting targets in the parcel dropping region when the conveying device is in motion;
wherein the at least one conveying device moves towards a delivery target along a first arc-shaped curve, and returns to a pickup region along a second arc-shaped curve after delivering a parcel.

* * * * *